2 Sheets—Sheet 1.

H. N. BAKER.

Printing Telegraph.

No. 3,812.

Reissued Jan. 25, 1870.

2 Sheets—Sheet 2.
H. N. BAKER.
Printing Telegraph.
No. 3,812.
Reissued Jan. 25, 1870.
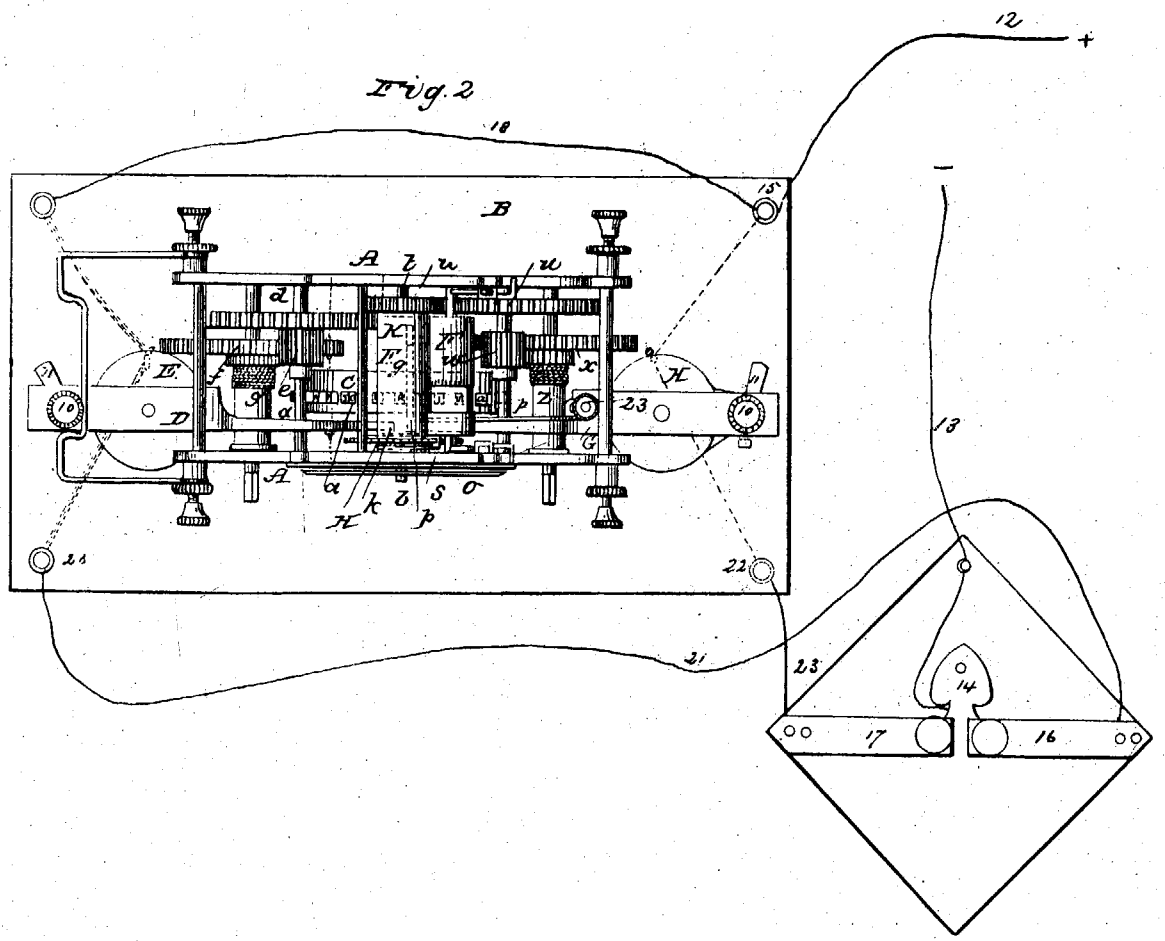

United States Patent Office.

GOLD AND STCCK TELEGRAPH COMPANY, OF NEW YORK, N. Y., ASSIGNEES, BY MESNE ASSIGNMENTS, OF HENRY N. BAKER.

*Letters Patent No.* 14,759, *dated April* 29, 1856; *reissue No.* 3,812, *dated January* 25, 1870.

IMPROVEMENT IN PRINTING-TELEGRAPHS.

The Schedule referred to in these Letters Patent and making part of the same.

*To all whom it may concern:*

Be it known that HENRY N. BAKER, of Union, in the county of Broome. State of New York, did invent a new and useful Improvement in Electro-Magnetic Printing-Telegraphs; and the following is hereby declared to be a full, clear, and exact description thereof, which will enable those skilled in the art to make and use the same, reference being had to the accompanying drawings, forming part of this specification, in which drawings—

Figure 2 is a plan of top view of the same, showing the circuit-connection

Similar letters indicate corresponding parts.

Figure 1:
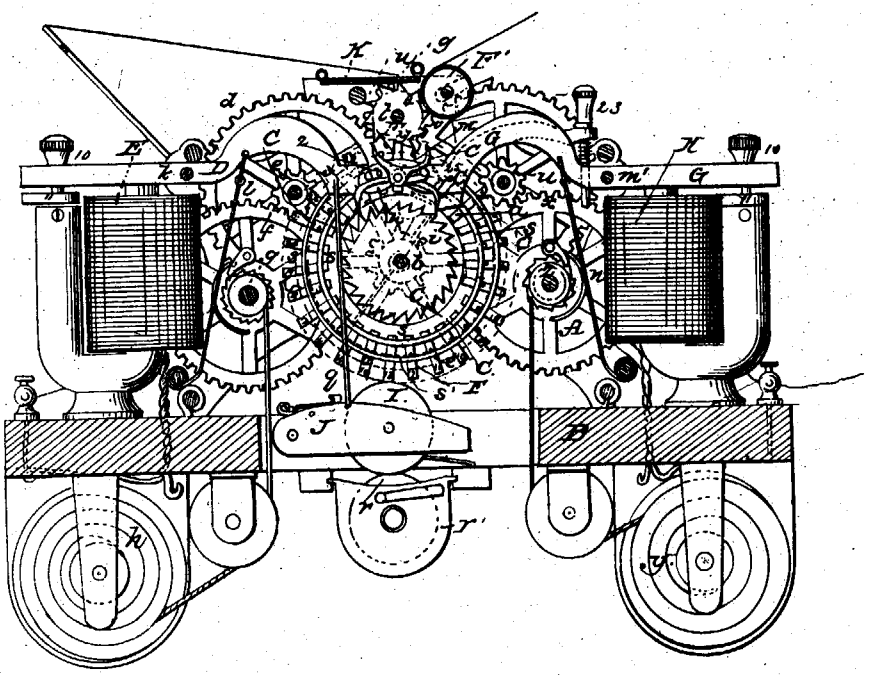
Figure 1 represents a front view of this invention, a portion of the frame being taken away to show the working-parts.

This invention relates to an electro-magnetic printing-telegraph, in which the magnet used for producing the impression is actuated by electrical impulses, and situated in a circuit distinct from the electrical impulses, which control the motions of the type-wheel in such a manner that impressions can be taken or the paper can be fed independently of any other operation while the type-wheel is at rest.

The movements of the type-wheel are controlled or produced by electrical impulses, and by a circuit distinct from the electrical impulses and circuit that actuate the printing-magnet, in such a manner that the type, or other character from which an impression is to be taken, can be brought into the desired position, in relation to the strip of paper or other material on which the impression is to be taken, by an independent movement.

This apparatus is also so arranged that it prints messages, in ordinary letters and figures, exclusively by the direct and controlling agency of different magnets, actuated at will by distinct electrical impulses.

The strip of paper or other material on which the messages are to be printed is fed along by a device that is distinct from the printing-magnet, but this device is so arranged that it can be brought into action by the printing-magnet.

A pointer and dial, which are marked with the same letters and characters contained on the types of the type-wheel, enable the operator to read off, during the operation, the messages which he transmits or receives.

A A are two brass standards, attached to a wooden base, B, to form a framing to support the principal working-parts of the instrument. In fig. 1, the front standard A is omitted, and the base B shown in section.

C is a type-wheel, with a double rim, containing a complete alphabet and such other signs as may be thought proper, in movable types *a a*, which are fitted to the wheel at equal distances apart, so as to be capable of a movement radially thereto, said movement being limited both inward and outward by pins 3 3, inserted in the types, between the rims *s s'* of the type-wheel.

The axle *b* of this type-wheel is operated by a clock-movement or train of gearing, *c d e f*, the motive-power of which may be a spring or weight, but in the drawing is supposed to be a spring attached to the fusee *h*, and acting on the gearing through cords running to a barrel, *g*, on the axle of the wheel *f*.

The axle *b* also carries the escapement-wheel *i* of the clock-movement, the said wheel having a number of teeth equal to the number of types in the type-wheel, and having applied to it a crutch, (or, perhaps more properly speaking, a double detent,) *j j'*, which works on a fixed centre, $j^2$.

This crutch is connected, by a pin, *k*, working in a slot, with one arm of a lever, D, of the first order, which hangs on a fixed centre, *k'*, and whose opposite arm forms the armature of a helical magnet, E, which is in an electro-magnetic circuit.

This lever has a spring, *l*, applied to the arm, which connects with the crutch, to withdraw the armature from the magnet when the circuit is open. This spring brings the pallet *j* of the crutch into the escapement-wheel and stops it, but when the circuit is closed, the power of this spring is overcome, and the armature drawn toward the magnet, giving the lever a movement, which draws out the pallet *j* of the crutch, and allows the escapement to move till arrested by the pallet *j'*. The opening of the circuit again causes the spring to move the lever, and remove the pallet *j'*, and cause the pallet *j* to fall into the next notch of the wheel to that which it last left, the escapement-wheel thus being allowed to move the distance of one tooth, and the type-wheel the distance from one type to another, every time the circuit through the magnet E is opened and closed.

On the front standard A is a graduated dial, *s'*, which is shown in red outlines in fig. 1, having engraved or otherwise marked upon it the same letters, signs, &c., as the types *a a* of the type-wheel, the said letters and signs being similarly arranged; and to the axle *h* of the type-wheel is attached a pointer, *o*, which moves with the type-wheel, and always points to a letter or sign on the said dial, corresponding to the letter or sign of the type-wheel which is at any time opposite to a roller, F, which is one of a pair of rollers, F F', employed to feed the strip of paper (represented by a blue outline in fig. 1) on which the printing is to be performed, the said roller F also serving to confine the paper, to enable it to receive the impression of the types.

The portion of the instrument above described does not effect the printing, but simply moves the type-wheel, to bring any desired letter opposite the roller F. In order to give an impression, the type has to be lifted up, as, when it arrives opposite the roller, its face is some distance therefrom, its weight causing it to fall in toward the centre of the wheel.

The lifting of the type, to give the impression, is performed by an armature-lever, G, which is arranged, in relation to a helical magnet, H, on the opposite side of the instrument, in a similar manner to the arrangement of the lever D relatively to the magnet E, the magnet H being placed in another circuit, and the lever G being hung on a centre, *m'*, and having a spring, *n*, applied, to throw off the armature when the circuit is open.

That extremity of this lever G which is on the opposite side of the centre *m'* to the armature, has a curved metal tongue, *p*, attached to it, which stands directly below any type which may happen to be under the roller F, and when the circuit through the magnet H is closed, the armature is drawn down, and the tongue *p* lifts up the type against the paper, and makes the impression, the type falling again by its own weight as soon as the circuit is opened, and the armature raised by the spring *n*.

The point of the tongue *p* is adjustable, relatively to the lever, by a screw, 23, which, as the tongue is pivoted to the lever at 25, will raise the point higher or lower.

The inking of the types is performed by an inking-roller, I, as they are severally brought to their lowest position, by the revolution of the type-wheel.

This roller is hung on a swinging frame, J, and is raised up to ink the type, every time the circuit through the magnet E is closed, by the connection of its frame, by means of a rod, *q*, to the lever D, and when the circuit is broken, it falls into contact with a distributing-roller, *r*, in an ink-trough, *r'*, below the base B.

The inking-roller is always in contact with the types, as they pass it, but as the pressure of the types is only what is due to their weight, until the roller is raised to bring the pin 3, of the type, immediately over its centre, to a bearing against the inner rim *s*, of the type-wheel, the force of the contact between the inking-roller and face of the type may not be sufficient to ink the type until the pin 3 finds a bearing.

The movement of the rollers F F', to feed the paper, or give it the movement necessary to produce proper spaces between the successive impressions of the type, is effected by a clock-movement, consisting of a train of wheels, *u v w x*, the motive-power of which may be a spring or weight, but in the drawing it is supposed to be a spring, attached to the fusee *y*, and acting on the gearing, through cords, running to a barrel, Z, on the axle of the wheel *x*.

The axle *t*, of the roller F, carries the escapement-wheel 4, of this clock-movement, the said escapement-wheel having applied to it a crutch or double detent, 5 6, which works on a fixed pivot, 8, and is connected, by a pin, 7, working in a slot, (see fig. 1,) with the lever G.

This crutch is operated by the lever G, as the circuit, through the magnet H, is opened and closed, in a similar manner to that in which the crutch *j j'* is operated upon by the opening and closing of the circuit through the magnet E, and the roller F is allowed to move just far enough to carry the paper the proper distance to give the required space between the impressions of the types.

The roller F' is kept in contact with the paper by springs, and the paper, passing through a slot, *g*, in the guide-plate K, is kept tight to the roller, by friction in the slot.

The guide-plate K, with its slot *g*, is shown in red outline, in fig. 2, to avoid confusion of parts.

The range of the levers D and G is regulated by screws 10 10, screwed into the magnets, and nuts 11 11, fitted thereto.

To explain the operation of the instrument, it is supposed to be placed in a merely local circuit, as is shown in fig. 2. The explanation of its operation, in this manner, will enable the operation of the instruments on a telegraph-line to be readily understood.

12 represents a wire, from the positive pole of a battery, and 13, a wire from the negative pole, said wire 13 connecting with a metal plate, 14, secured to a wooden base, which is provided with two spring-keys 16 17, and the wire 12 connecting with a screw, 15, on the base of the telegraph-instrument. From the screw 15, a wire, 18, goes to the screw 19, to which, and to the screw 20, the helix of the magnet E is connected, and from the screw 20, a wire, 21, goes to the key 16. One end of the helix of the magnet H also connects with the screw 15, and the other with the screw 22, from which a wire, 23, goes to the key 17.

To distinguish the branches of the circuit leading to the keys 16 and 17, the former is tinted red and the latter blue. By depressing the key 16, to bring its point in contact with the plate 14, and leaving the other key, 17, out of contact, the circuit is caused to pass through the red wire, and the helix of the type-wheel magnet E. By playing on the key 16, with the finger, to open and close the circuit the required number of times, the type-wheel may be brought to such a position as to present any desired letter opposite the roller F. Then, by allowing the finger-key 16 to rise, and depressing the key 17, the circuit passes through the blue wire, and the printing and feeding-magnet H, causing the paper to move along, and the type, opposite the roller F, to be lifted by the curved tongue *p*, and pressed against the paper, under the said roller, with sufficient force to produce the impression. By thus playing the key 16, and moving the type-wheel to bring the proper letters, in succession, opposite to the roller F, and then depressing the key 17, words are printed.

To repeat two letters in the same word, the key 17 must be depressed twice, without closing the key 16. To make the spaces between the words, the key 16 is first depressed, to close the circuit through the magnet H, the circuit through the type-wheel magnet not having been opened, when the movement of the lever G takes place, and the type-wheel, consequently, only having moved half the distance necessary to bring a new type between the tongue *p* and the roller F, causes the tongue to fall into a space between two types, and thus renders it inoperative, but yet allows the movement of the roller F to take place to feed the paper.

By keeping the key 16 closed, and closing and opening the key 17, a space of any desired length may be produced, but for the spaces to separate the words, the key 16 needs only to be kept closed during one closing and opening movement of the key 17, after which it may be played as before, to move the type-wheel.

One of the instruments is, of course, employed at every station of a telegraph-line, and two separate wires are used, running through all the stations, one communicating with the type-wheel magnets of all the instruments, and the other with the printing and feeding-magnets of all the instruments.

If desired, a double relay or receiving-magnet may be employed at each station, the two keys to operate the instruments being attached to the two main wires.

Before commencing operations, it is necessary for the operator, who is about to send a communication, to see that the pointer *o*, of his instrument, corresponds with the type-wheel of the instrument at the station he is sending to. If it is arranged that the same position of the type-wheel shall always be adopted before commencing operations, the whole of the instruments are sure to be in unison. The sending-operator, spelling off his words by the aid of the pointer *o*, and the dial, operates the two keys, as before described, and the printing of the communication may be performed at any or all of the stations on the line, as may be desired, and the message received may also be read off from the dial *s**.

What is claimed as new, and desired to be secured by Letters Patent, is—

1. In a telegraph-printer, a magnet for producing or controlling the impressions actuated by electrical impulses, and situated in a main circuit, distinct from and independent of the electrical impulses and circuit which control the movements of the type-wheel, so that the impressions can be taken on the paper, independently of any other operation, substantially as set forth.

2. A roller, actuated by a weight or spring, for feeding the paper, in combination with a type-wheel, actuated or controlled by a magnet, in one main circuit, and the impression-mechanism, substantially as specified, actuated by a magnet in another main circuit, and liberating the mechanism that feeds the paper, substantially as set forth.

GOLD & STOCK TELEGRAPH CO.
By GEO. B. FIELD, *President*
H. L. HOTCHKISS, *Secretary*.

Witnesses;
GEO. D. WALKER,
CHAS. H. SMITH.